United States Patent
Oh et al.

(10) Patent No.: US 11,365,125 B2
(45) Date of Patent: Jun. 21, 2022

(54) SUPERCRITICAL DRYING METHOD FOR SILICA WET GEL BLANKET

(71) Applicant: LG CHEM, LTD., Seoul (KR)

(72) Inventors: Kyoung Shil Oh, Daejeon (KR); Se Won Baek, Daejeon (KR); Mi Ri Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/972,128

(22) PCT Filed: Dec. 13, 2019

(86) PCT No.: PCT/KR2019/017686
§ 371 (c)(1),
(2) Date: Dec. 4, 2020

(87) PCT Pub. No.: WO2020/122664
PCT Pub. Date: Jun. 18, 2020

(65) Prior Publication Data
US 2021/0230006 A1    Jul. 29, 2021

(30) Foreign Application Priority Data
Dec. 13, 2018   (KR) .................. 10-2018-0160982

(51) Int. Cl.
*C01B 33/158*    (2006.01)

(52) U.S. Cl.
CPC ...... *C01B 33/1585* (2013.01); *C01P 2006/32* (2013.01)

(58) Field of Classification Search
CPC ..... C01B 33/1585; C01P 2006/32; B01J 3/00; B01J 3/008
See application file for complete search history.

(56) References Cited

U.S. PATENT DOCUMENTS

| | | |
|---|---|---|
| 2004/0087670 A1 | 5/2004 | Lee et al. |
| 2018/0072578 A1 | 3/2018 | Kim et al. |
| 2018/0099873 A1 | 4/2018 | Kim et al. |
| 2018/0134566 A1* | 5/2018 | Kim ............... F16L 59/026 |

(Continued)

FOREIGN PATENT DOCUMENTS

| | | |
|---|---|---|
| EP | 3260417 A1 | 12/2017 |
| EP | 3287416 A1 | 2/2018 |

(Continued)

OTHER PUBLICATIONS

Van Bommel (Drying of silica aerogel with supercritical carbon dioxide, 1995, Elsevier) (Year: 1995).*

(Continued)

*Primary Examiner* — Anthony J Zimmer
*Assistant Examiner* — Logan Edward Laclair
(74) *Attorney, Agent, or Firm* — Dentons US LLP (57) ABSTRACT

Provided is a supercritical drying method for a silica wet gel blanket, and a method for producing a silica aerogel blanket including the same, the supercritical drying method being capable of improving drying efficiency. The supercritical drying method improves the efficiency of a supercritical drying step by reducing carbon dioxide usage without additional equipment investment and energy input, thereby drying a silica wet gel blanket in a more economical manner.

13 Claims, 4 Drawing Sheets

(56) References Cited

U.S. PATENT DOCUMENTS

2018/0312407 A1    11/2018   Oh et al.
2019/0062167 A1    2/2019   Kim et al.

FOREIGN PATENT DOCUMENTS

| | | |
|---|---|---|
| JP | 4323302 | 9/2009 |
| JP | 2013-067521 | 4/2013 |
| KR | 10-2011-0033388 | 3/2011 |
| KR | 10-2017-0086830 | 7/2017 |
| KR | 10-2017-0104956 | 9/2017 |
| KR | 10-2018-0033064 | 4/2018 |
| KR | 10-2018-0040373 | 4/2018 |
| WO | 2001-28675 | 4/2001 |

OTHER PUBLICATIONS

Rueda et al., "Production of silica aerogel microparticles loaded with ammonia borane by batch and semicontinuous supercritical drying techniques," J. of Supercritical Fluids 92:299-310 (2014).
García-González et al., "Supercritical drying of aerogels using CO2: Effect of extraction time on the end material textural properties," J. of Supercritical Fluids 66:297-306 (2012).

\* cited by examiner

SUPERCRITICAL DRYING METHOD FOR SILICA WET GEL BLANKET

CROSS-REFERENCE TO RELATED APPLICATIONS

This application is a National Stage Application of International Application No. PCT/KR2019/017686 filed on Dec. 13, 2019, which claims the benefit of Korean Patent Application No. 10-2018-0160982, filed on Dec. 13, 2018, in the Korean Intellectual Property Office, the disclosure of which is incorporated herein in its entirety by reference.

TECHNICAL FIELD

The present invention relates to a supercritical drying method for a silica wet gel blanket and a method for producing a silica aerogel blanket including the same, the supercritical drying method capable of improving drying efficiency.

BACKGROUND

Aerogel is a highly porous material composed of nanoparticles, and has high porosity, specific surface area, and low thermal conductivity, thereby attracting attention as a thermal insulation material, a soundproofing material, and the like of high efficiency. However, since the aerogel has very low mechanical strength due to the porous structure thereof, an aerogel composite in which aerogel is bonded to a fibrous blanket by being impregnated therewith, the fibrous blanket such as an inorganic fiber or an organic fiber, both of which are conventional heat insulation fibers, has been developed.

Among the above, silica aerogel is a highly porous material having high porosity, specific surface area, and low thermal conductivity, so that the application thereof in various fields, such as in a thermal insulation material, a catalyst, a sound absorbing material, an interlayer insulation material for a semiconductor circuit, and the like are expected. Although the rate of silica aerogel being commercialized is very slow due to the complex manufacturing process and low mechanical strength thereof, the steady research on the silica aerogel has resulted in the release of early application products, and the market expansion thereof is gradually increasing including an insulation material market. Since the silica aerogel has very low mechanical strength due to the porous structure thereof, the silica aerogel is typically combined with a substrate and commercialized in the form of an aerogel blanket or an aerogel sheet.

For example, a silica aerogel blanket using silica aerogel is prepared through a silica sol preparation process, a silica sol gelation process, a silica sol aging process, a silica sol surface modification process, and a silica sol drying process.

The drying process is one step for producing a silica aerogel blanket, and can be performed through a drying process in which a solvent is removed while maintaining the pore structure of the silica aerogel blanket. The drying process can be performed by an ambient drying process or a supercritical drying process.

The ambient drying process does not require high pressure reaction conditions and a special high pressure equipment for supercritical drying, so that the process thereof is simple and economical. However, since water or an organic solvent evaporates at a high temperature, when compared with supercritical drying, ambient drying has a problem in that the heat insulation performance is sharply reduced due to the occurrence of the significant destruction of the pore structure inside a gel. In addition, the above problem is further exacerbated when drying is directly performed without substitution with an organic solvent having a low surface tension.

In order to maintain the porosity in the aerogel and to prevent shrinkage during drying, a supercritical drying process using carbon dioxide in a supercritical state can be used. The supercritical drying is to perform drying by introducing carbon dioxide in a supercritical state into a high-pressure reactor to extract a solvent in a blanket product which has been subjected to gelation. Since the supercritical drying method maintains the three-dimensional structure of the aerogel, it is possible to produce a product with excellent heat insulation performance.

Meanwhile, in order to further improve the drying efficiency of a supercritical drying process, there has been an attempt to improve the diffusion rate of carbon dioxide so as to facilitate the substitution of a solvent and carbon dioxide. In one example, a technique to increase the diffusivity of carbon dioxide by applying a pulse during a supercritical drying process has been studied. However, such technique requires the development of separate equipment or devices, so that there is still a need for the development of a method for increasing the drying efficiency in a simpler way.

PRIOR ART DOCUMENT

Patent Document
(Patent Document 1) JP 2013-067521 A

DISCLOSURE OF THE INVENTION

Technical Problem

An aspect of the present invention is to reduce carbon dioxide usage and improve drying efficiency in a supercritical drying step for an aerogel blanket. Specifically, in the supercritical drying step, by repeating supplying and discontinuing the supply of carbon dioxide to two supercritical extractors in an alternate manner, a supercritical drying method for a silica wet gel blanket with maximized drying efficiency with a small amount of carbon dioxide is provided.

Another aspect of the present invention is to provide a method for producing a silica aerogel blanket using the supercritical drying method for a silica wet gel blanket.

Yet another aspect of the present invention is a silica aerogel blanket produced by the production method, the silica aerogel blanket having excellent material properties with low thermal conductivity and water repellency at an inner end thereof.

Technical Solution

According to an aspect of the present invention, there is provided a supercritical drying method for a silica wet gel blanket using first and second supercritical extractors, the method comprising, placing the silica wet gel blanket inside each of the first and second supercritical extractors, (a) supplying carbon dioxide to the first supercritical extractor and not supplying carbon dioxide to the second supercritical extractor, and (b) not supplying carbon dioxide to the first supercritical extractor and supplying carbon dioxide to the second supercritical extractor, wherein the steps (a) and (b) are performed alternately at least two times each.

According to another aspect of the present invention, there is provided a method for producing a silica aerogel blanket, the method comprising preparing a silica sol, impregnating the silica sol in a blanket base material and then subjecting the impregnated silica sol to gelation, subjecting a silica wet gel blanket formed by the gelation reaction to surface modification, and subjecting the silica wet gel blanket to supercritical drying, wherein the supercritical drying step is performed by the supercritical drying method described above.

According to yet another aspect of the present invention, there is provided a silica aerogel blanket having the difference in thermal conductivity between an inner end and an outer end at room temperature (25° C.) in the state in which the blanket is wound is 1.0 mW/mK or less, wherein the inner end and the outer end of the blanket refer to both end sections in the case in which the blanket is divided into three parts on the basis of the longitudinal direction in the state in which the winding of the blanket is released.

Advantageous Effects

According to the supercritical drying method of the present invention, since carbon dioxide usage is reduced without additional equipment investment and energy input, the efficiency of a supercritical drying step is improved, so that the silica wet gel blanket can be dried in a more economical manner.

In addition, when the silica aerogel blanket is produced using the supercritical drying method, there is an advantage in that an aerogel blanket having uniform and excellent physical properties can be produced.

DETAILED DESCRIPTION

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor can properly define the meaning of the words or terms to best explain the invention.

When a supercritical drying method is used for drying a silica wet gel blanket, despite the excellent diffusivity of carbon dioxide, it takes a lot of time to diffuse the carbon dioxide due to the meso-porous structure of the silica wet gel blanket. In addition, when a supercritical drying process is performed by continuously supplying carbon dioxide to a supercritical extractor, a channeling phenomenon in which carbon dioxide does not flow evenly but flows toward some regions occurs, thereby deteriorating the drying efficiency of the supercritical drying process and making it difficult to evenly dry the silica wet gel blanket. As a result, there is a problem in that the physical properties of a silica aerogel blanket to be finally produced are deteriorated.

Therefore, in the present invention, by reducing the absolute usage of carbon dioxide, and at the same time, increasing the amount of an alcohol solvent to be substituted for the usage of carbon dioxide, the drying efficiency of the supercritical drying process is greatly increased. In addition, by reducing the absolute usage of carbon dioxide, the energy for cooling and heating required for the recycling of carbon dioxide and the cost required therefor are also reduced.

Also, the present invention not only increases the drying efficiency of the supercritical drying step, but also produces a silica aerogel blanket which has small difference in thermal conductivity between an inner and an outer end thereof, thereby having excellent even thermal insulation, and has low water repellency, thereby having high hydrophobicity, and which can be usefully used in some insulation application fields without extra treatment.

Hereinafter, the present invention will be described in detail.

Supercritical Drying Method for Silica Wet Gel Blanket

The present invention relates to a supercritical drying method for a silica wet gel blanket using first and second supercritical extractors, the method comprising, placing the silica wet gel blanket inside each of the first and second supercritical extractors, (a) supplying carbon dioxide to the first supercritical extractor and not supplying carbon dioxide to the second supercritical extractor, and (b) not supplying carbon dioxide to the first supercritical extractor and supplying carbon dioxide to the second supercritical extractor, wherein the steps (a) and (b) are performed alternately at least two times each.

The supercritical drying method of the present invention is a method using the first and second supercritical extractors, wherein the supercritical extractor means a high-pressure device in which supercritical drying of the silica wet gel blanket is performed using a supercritical fluid.

When two or more supercritical extractors are used as in the present invention, it is possible to dry two or more silica wet gel blankets simultaneously, and since it is possible to operate two supercritical extractors in a single system such as a carbon dioxide injection pump, a separator, a carbon dioxide separation tank, and a heat exchanger, investment costs and operating costs can be reduced.

The supercritical drying method of the present invention comprises (a) supplying carbon dioxide to the first supercritical extractor and not supplying carbon dioxide to the second supercritical extractor, and (b) not supplying carbon dioxide to the first supercritical extractor and supplying carbon dioxide to the second supercritical extractor.

That is, the step (a) of not supplying carbon dioxide to the second supercritical extractor while supplying carbon dioxide to the first supercritical extractor is performed, and then the step b) of supplying carbon dioxide to the second supercritical extractor and not supplying carbon dioxide to the first supercritical extractor is performed. The steps (a) and (b) can be performed sequentially or in reverse order, and are performed alternately and repeatedly based on a step started first.

Specifically, in the supercritical drying method of the present invention, the steps (a) and (b) are alternately performed, and the steps (a) and (b) are repeated at least two times each.

By alternately performing the steps (a) and (b), carbon dioxide is supplied and discontinued to be supplied to the first supercritical extractor and the second supercritical extractor, so that the carbon dioxide usage can be reduced in half when compared to a case in which carbon dioxide is simultaneously and continuously supplied to each of the extractors.

In addition, the steps (a) and (b) can be repeated at least two times each. For example, it means that the step (a), the step (b), the step (a), and the step (b) are performed.

When carbon dioxide is continuously supplied to a supercritical extractor, the temperature inside the extractor is lowered due to continuously flowing carbon dioxide, and thus, the efficiency of a supercritical drying step is deteriorated. In addition, inside the supercritical extractor, a channeling phenomenon in which carbon dioxide flows deflected occurs. The channeling phenomenon refers to a phenomenon in which a fluid flows in a layer of a filler without being uniformly dispersed but flows therein unevenly using a portion as a passage. Carbon dioxide in the supercritical extractor also tends to flow toward some portions in the extractor. When carbon dioxide is continuously supplied during the entire process of the supercritical drying process, due to the channeling phenomenon, a phenomenon in which the carbon dioxide flows toward a specific portion is accelerated and cannot be controlled, so that ultimately, there is a problem in that the drying efficiency of the supercritical drying process is sharply deteriorated.

In the present invention, by performing the steps (a) and (b) alternately at least two times each, carbon dioxide is not allowed to continuously flow in one extractor, and by allowing the flow and discontinuation of the flow of carbon dioxide to occur repeatedly, the channeling phenomenon is prevented. Also, since sufficient time is given the carbon dioxide to be subjected to solvent substitution with a solvent contained in meso pores inside the silica wet gel blanket, it is possible to further increase the supercritical drying efficiency compared with the continuous operation.

The supercritical drying method according to an embodiment of the present invention can perform the steps (a) and (b) alternately at least four times each. Also, the steps (a) and (b) can be performed alternately at least four times each, at least five times each, at least six times each, and the like.

According to an embodiment of the present invention, while maintaining the total time spent for the supercritical drying step, when the supercritical drying process is performed by adjusting the time spent for each of the steps (a) and (b) to change the number of repetitions thereof, there were effects of improving the drying efficiency and improving the physical properties of the silica aerogel blanket at various times of repetition.

In the supercritical drying method of the present invention, before the steps (a) and (b), a silica wet gel blanket is placed in each of the first and second supercritical extractors.

Specifically, a silica wet gel blanket is placed inside the first supercritical extractor and then the step (a) is performed, and a silica wet gel blanket is placed inside the second supercritical extractor and then the step (b) is performed, followed by repeatedly performing the steps (a) and (b) in an alternate manner. Alternatively, a silica wet gel blanket is placed inside the second supercritical extractor and then the step (b) is performed, and a silica wet gel blanket is placed inside the first supercritical extractor and then the step (a) is performed, followed by repeatedly performing the steps (b) and (a) in an alternate manner.

That is, just before supplying carbon dioxide to a supercritical extractor through the step (a) or (b), the silica wet gel blanket can be placed inside the supercritical extractor. When a silica wet gel blanket is placed inside a supercritical extractor and carbon dioxide is not supplied for a long time, as will be described later, the silica wet gel blanket is left to stand inside the supercritical extractor in a heated state without the supply of carbon dioxide, so that the silica wet gel blanket is dried at a high temperature without carbon dioxide, resulting in the structural deformation or deterioration of physical properties thereof.

According to an embodiment of the present invention, by placing a blanket in the first supercritical extractor just before a step (step (a)) of supplying carbon dioxide to the first supercritical extractor, and by placing a blanket in the second supercritical extractor just before a step (step (b)) of supplying carbon dioxide to the second supercritical extractor, the gap between the point of time of introducing a silica wet gel blanket and the point of time of supplying carbon dioxide is reduced to prevent the silica wet gel blanket to be dried due to a high temperature inside the supercritical extractor without carbon dioxide.

In the supercritical drying method of the present invention, before placing the silica wet gel blanket inside each of the first and second supercritical extractors, a step of raising the temperature inside each of the first and second supercritical extractors can be performed.

In the step of raising the temperature the temperature inside the first and second supercritical extractor can be raised to 40-100° C., specifically 50-90° C., more preferably 60-80° C.

The steps (a) and (b) performed for the first time among the steps of (a) and (b), which are repeatedly performed, can be to raise the inner pressure of the first or second supercritical extractors to 75-250 bar, specifically 100-200 bar, more specifically 150-170 bar while supplying carbon dioxide to the first or second supercritical extractors.

That is, the supercritical drying method of the present invention includes, after raising the temperature inside the first and second supercritical extractors to the above temperature, placing a silica wet gel blanket in one supercritical extractor and then raising pressure to the above pressure while supplying carbon dioxide and placing a silica wet gel blanket in the other supercritical extractor and then raising pressure to the above pressure while supplying carbon dioxide. After going through the above step, while continuously supplying carbon dioxide alternately to the two supercritical extractors, the silica wet gel blanket is subjected to supercritical drying.

Carbon dioxide is in a gaseous state at room temperature and atmospheric pressure. However, when a temperature and pressure exceed a predetermined temperature and pressure limit called a supercritical point, the evaporation process does not occur, and the carbon dioxide exists in a critical state in which gas and liquid cannot be distinguished. Carbon dioxide in the critical state is referred to a supercritical carbon dioxide. In general, in a supercritical drying process using supercritical carbon dioxide, a silica gel is placed in a supercritical drying reactor, and then carbon dioxide in a liquid state is supplied thereto. Thereafter, the carbon dioxide is converted to be in a supercritical state by increasing the temperature and pressure inside the supercritical extractor, and then a supercritical drying process is performed. In this case, it takes a long time to make carbon dioxide to be in a supercritical state, and there is the temperature deviation between a central portion of the supercritical extractor and the outside, so that the drying efficiency is reduced, and the cost spent for the operation is increased.

According to an embodiment of the present invention, by performing a step of increasing the temperature and pressure of a supercritical extractor first without supplying carbon dioxide in a liquid state to the supercritical extractor, carbon dioxide is allowed to reach a supercritical state just after being supplied to the supercritical extractor, so that the time required for a supercritical drying step can be shortened and the temperature deviation between the central portion of the supercritical extractor and the outside can be reduced.

Carbon dioxide supplied to the first and second supercritical extractors can be of a temperature of 50-100° C., preferably 60-80° C., more preferably 70-80° C.

In the supercritical drying method of the present invention, the steps (a) and (b) can each be performed for 5-30 minutes. According to an embodiment of the present invention, even when a supercritical drying process was performed by allowing each of the steps (a) and (b) to be performed for 5 minutes, 10 minutes, 15 minutes, 20 minutes, and the like, the drying efficiency of the supercritical drying step and the physical properties of a silica aerogel blanket to be produced were still confirmed to be excellent. That is, the supercritical drying method of the present invention can be used in various ways by changing the timing of alternating the supply and the discontinuation of the supply of carbon dioxide.

In the supercritical drying method of the present invention, the amount of carbon dioxide supplied to the first or second supercritical extractor can be 300-700 kg/batch, specifically 300-600 kg/batch, more preferably 300-400 kg/batch. Specifically, the capacity of the first and second supercritical extractors can be 70 L.

As described above, in the present invention, while two supercritical extractors are used, carbon dioxide is not simultaneously and continuously added to both the supercritical extractors. Rather, the supply and the discontinuation of the supply of carbon dioxide are alternately repeated, so that it is possible to use only about half of the amount of carbon dioxide when compared with a case in which carbon dioxide is continuously added to two supercritical extractors.

In the supercritical drying method of the present invention, the solvent recovery rate calculated by Equation 1 below can be 90% or greater.

Solvent recovery rate (%)=[(Amount of solvent discharged and recovered from supercritical extractor)/(Amount of solvent in silica wet gel blanket introduced into supercritical extractor)]× 100   <Equation 1>

The supercritical drying method of the present invention exhibits a solvent recovery rate equal to or higher than that of a case in which carbon dioxide is continuously supplied to both the first and second supercritical extractors. Although about half of the carbon dioxide was used, the exchange reaction between the solvent and the carbon dioxide occurred more actively, and drying efficiency more than two times the drying efficiency based on the same amount of carbon dioxide was achieved.

The above effect was achieved since the supply and the discontinuation of the supply of carbon dioxide to the first and second supercritical extractors were alternately repeated. Since carbon dioxide channeling was prevented and carbon dioxide was diffused into meso pores, thereby facilitating solvent substitution, high drying efficiency was exhibited even with only a small amount of carbon dioxide.

Method for Manufacturing Silica Aerogel Blanket

The present invention provides a method comprising 1) preparing a silica sol, 2) impregnating the silica sol in a blanket base material and then subjecting the impregnated silica sol to gelation to produce a silica wet gel blanket, 3) subjecting the silica wet gel blanket to surface modification, and 4) subjecting the surface-modified silica wet gel blanket to supercritical drying, wherein the supercritical drying step is performed by the supercritical drying method of the present invention.

1) Preparing a Silica Sol

A silica sol of the present invention can be prepared by mixing a silica precursor, an alcohol, and an acidic aqueous solution.

The silica precursor can be an alkoxide-based compound containing silicon, and can specifically be tetraalkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, tetradodecyl orthosilicate, trimethyl ethoxysilane (TMES), or a mixture thereof, but is not limited thereto.

The silica precursor can be used in an amount such that the content of silica ($SiO_2$) contained in the silica sol is 0.1 wt % to 30 wt %, but is not limited thereto. If the content of the silica is less than 0.1 wt %, the content of a silica aerogel in a blanket to be finally produced is too low to achieve the desired level of heat insulation effect. If the content of the silica is greater than 30 wt %, due to an excessive formation of a silica aerogel, there is a possibility that the mechanical properties of the blanket, particularly the flexibility thereof, can deteriorate.

The alcohol can specifically be a monohydric alcohol such as methanol, ethanol, isopropanol, and butanol; or polyhydric alcohol such as glycerol, ethylene glycol, propylene glycol, diethylene glycol, dipropylene glycol, and sorbitol, and any one thereof or a mixture of two or more thereof can be used. Among the above, when considering the miscibility with water and an aerogel, the alcohol can be a monohydric alcohol having 1-6 carbon atoms such as methanol, ethanol, isopropanol, and butanol.

The alcohol (a polar organic solvent) as described above can be used in an appropriate amount by those skilled in the art in consideration of the degree of hydrophobicity in a silica aerogel to be finally produced while promoting a surface modification reaction.

The acidic aqueous solution can promote the gelation of a silica sol to be described later. An acid precursor in the acidic aqueous solution can specifically include one or more kinds of acid such as nitric acid, hydrochloric acid, acetic acid, sulfuric acid, and hydrofluoric acid, and can be used in an amount to promote the hydration of the silica precursor to be followed.

2) Impregnating Silica Sol in Blanket Base Material and Performing Gelation

The present step is for producing a silica gel composite, and can be performed by adding a base catalyst to the silica sol and impregnating the silica sol added with the base catalyst in a base material for the blanket.

In the present invention, gelation can form a network structure from a silica precursor material, wherein the network structure can be a planar mesh structure in which specific polygons having one or more types of atomic arrangement are linked to each other, or a structure in which specific polyhedrons share their vertices, edges, faces, and the like with each other to form a three-dimensional skeleton structure.

The base catalyst which can be used to induce the gelation reaction serves to promote gelation by increasing the pH of the silica sol.

The base catalyst can be an inorganic base such as sodium hydroxide and potassium hydroxide; or an organic base such as ammonium hydroxide. However, in the case of an inorganic base, a metal ion included in a compound can be coordinated to a Si—OH compound. Thus, an organic base is preferred. Specifically, the organic base can be ammonium hydroxide ($NH_4OH$), tetramethylammonium hydroxide (TMAH, tetraethyl ammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine-triethylamine, triisopropylamine, tributylamine, choline, monoethanolamine, diethanolamine, 2-aminoethanol, 2-(ethylamino) ethanol, 2-(methylamino) ethanol, N-methyldiethanolamine, dimethylamino-ethanol, diethylaminoethanol, nitrilotriethanol, 2-(2-amino-ethoxy)ethanol, 1-amino-2-propanol, triethanolamine, monopropanolamine, or dibutanol, and a mixture of two or more thereof can be used. More specifically, the base can be ammonium hydroxide ($NH_4OH$).

The base catalyst can be included in an amount such that the pH of the silica sol becomes 4 to 8. If the pH of the silica sol is out of the above range, gelation may not be easily achieved, or the rate of gelation may become too slow, so that the processability may be deteriorated. In addition, since the base may be precipitated when added in a solid phase, it may be preferable that the base is added in the form of a solution diluted with the above alcohol (polar organic solvent).

The gelation of the silica sol of the present invention can occur in a state in which the silica sol is impregnated in the blanket base material.

The impregnation can be performed in a reaction vessel capable of accommodating a blanket base material, and can be performed by pouring a silica sol into the reaction vessel, or by placing a blanket base material in a reaction vessel having a silica sol to be soaked. At this time, in order to improve the bonding of the blanket base material and the silica sol, the blanket base material can be lightly pressed down to be sufficiently impregnated. Thereafter, the blanket base material can be pressed to a predetermined thickness at a constant pressure to remove the remaining silica sol, so that drying time can be reduced.

The blanket base material can be a film, a sheet, a net, a fiber, a porous body, a foam, a non-woven body, or a laminate of two or more layers thereof. Also, according to the use of a blanket base material, surface roughness can be formed or patterned on the surface thereof. Specifically, the blanket base material can be a fiber capable of further improving heat insulation performance by including a space or a void through which a silica aerogel can be easily inserted into the blanket base material.

Specifically, the blanket base material can be polyamide, polybenzimidazole, polyaramid, an acryl resin, a phenol resin, polyester, polyetheretherketone (PEEK), polyolefin (for example, polyethylene, polypropylene, or a copolymer thereof, and the like), cellulose, carbon, cotton, wool, hemp, a non-woven fabric, a glass fiber, or ceramic wool, and the like.

3) Surface Modifying Silica Wet Gel Blanket Formed by Gelation Reaction

In the silica aerogel blanket, a silanol group (Si—OH) is present on the surface of the silica, and the silanol group absorbs water in the air due to the hydrophilic properties thereof, so that there is a disadvantage in that thermal conductivity is gradually increased. Therefore, in order to maintain low thermal conductivity, there is a need to modify the surface of the silica wet gel blanket to be hydrophobic in advance.

The surface modification can be achieved by a surface modifier including a polar solvent and an organosilane compound.

The polar solvent can be methanol, ethanol or isopropyl alcohol, and the organosilane compound can be trimethylchlorosilane (TMCS), hexamethyldisilazane (HMDS), methyltrimethoxysilane, trimethylethoxysilane, ethyltriethoxysilane, phenyltriethoxysilane, or the like.

The surface modification can be omitted when a precursor containing a hydrophobic group is used alone or in a mixture when producing a silica sol. An aging process can be performed before performing the surface modification. The aging is an optional step in which the silica wet gel is left to stand at a suitable temperature to allow the chemical change thereof to be completely achieved, thereby forming the network structure more firmly and enhancing mechanical stability.

The aging step of the present invention can be performed by placing a basic catalyst such as sodium hydroxide (NaOH), potassium hydroxide (KOH), ammonium hydroxide ($NH_4OH$), triethylamine, pyridine, and the like in a solution, which is diluted to 1-10% concentration in an organic solvent, for 1-10 hours at a temperature of 50-90° C.

4) Supercritically Drying Silica Wet Gel

The step of supercritically drying a silica wet gel is by the supercritical drying method for silica wet gel blanket of the present invention.

The supercritical drying method for silica wet gel blanket is the same as described above.

Meanwhile, the method for producing a silica aerogel blanket according to an embodiment of the present invention can further perform a washing step before the supercritical drying step. The washing step is a step for removing impurities (unreacted substances, by-products, and the like) generated during the reaction and residual ammonia, which can generate an ammonium carbonate salt by reacting with carbon dioxide during supercritical drying, and the like in order to obtain a hydrophobic silica aerogel with high purity, and can be performed by a dilution process or an exchange process using a non-polar organic solvent.

Silica Aerogel Blanket

The present invention provides a silica aerogel blanket having the difference in thermal conductivity between an inner end and an outer end at room temperature (25° C.) in the state in which the blanket is wound is 1.0 mW/mK or less, wherein the inner end and the outer end of the blanket refer to both end sections in the case in which the blanket is divided into three parts on the basis of the longitudinal direction in the state in which the winding of the blanket is released.

The silica aerogel blanket means a material which is made of a silica aerogel material as a blanket base material in the form of a mattress or a sheet by being composited with a fiber and the like, and has properties of being bent, folded or cut due to the flexibility thereof. A silica aerogel imparts heat insulation properties due to the porosity thereof, and a blanket base material such as a fiber serves to enhance the flexibility and mechanical strength of the silica aerogel blanket.

The thermal conductivity refers to the degree of heat transfer through a specific medium between two surfaces on any one side of a material or a composite having a temperature difference between the two surfaces. Specifically, the thermal conductivity is measured by dividing heat energy transmitted per unit hour and unit area by temperature difference.

When the thermal conductivity is low, it means a strong tendency of preserving heat without losing the heat to the outside, and when the thermal conductivity of a silica aerogel blanket is low, it means that the insulation performance thereof is excellent.

Figure 1:
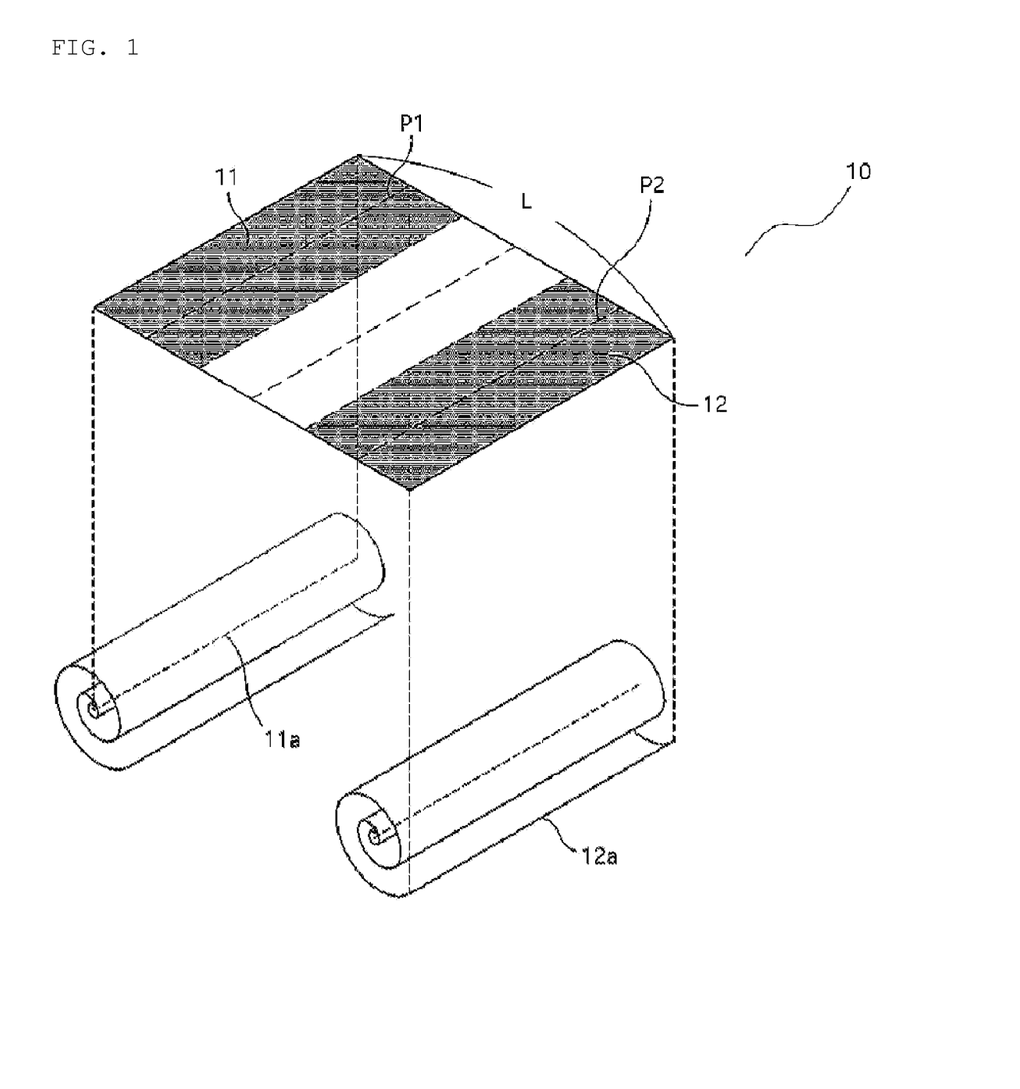
FIG. 1 shows a silica aerogel blanket (1 batch roll) according to the present invention.
Figure 2:
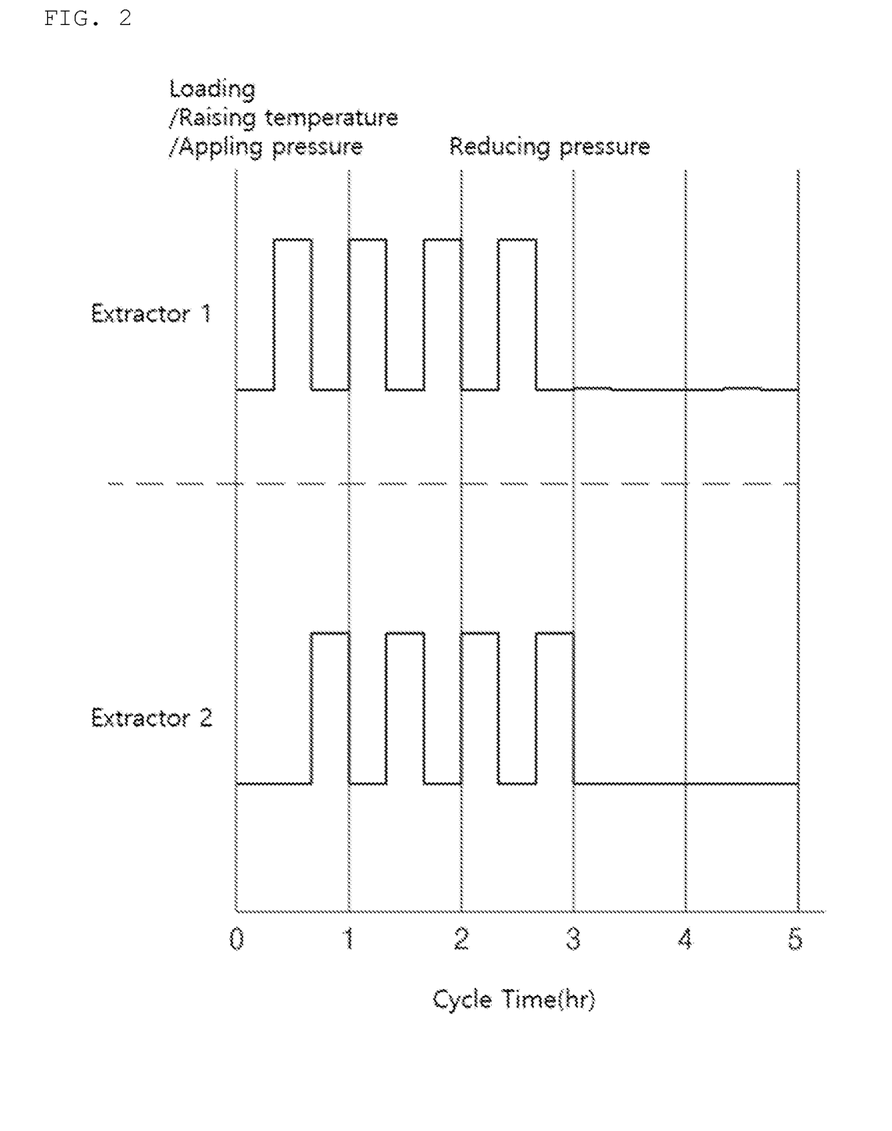
FIG. 2 shows a method for supplying and discontinuing the supply of carbon dioxide in a supercritical drying step according to one example of the present invention.
Figure 3:
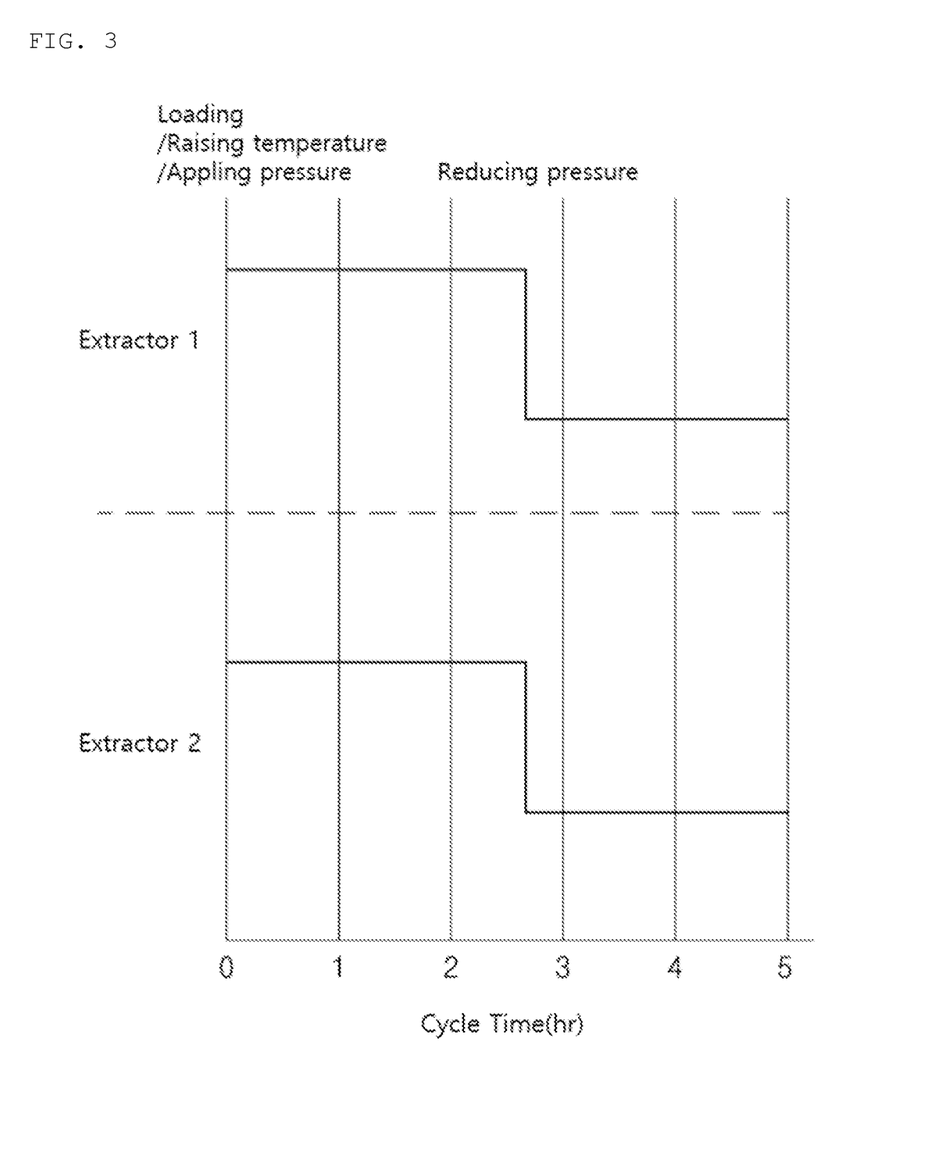
FIG. 3 shows a method for supplying and discontinuing the supply of carbon dioxide in a supercritical drying step according to one comparative example of the present invention.

A silica aerogel blanket according to an embodiment of the present invention is shown in FIG. 1. In the case of a silica aerogel blanket 10 of the present invention, the difference in thermal conductivity between an inner end 11 and an outer end 12 is low in a wound state, that is, in the form of a roll, thereby exhibiting even insulation properties overall. In particular, the thermal conductivity of the inner end 11, which is a portion generally not exhibiting excellent insulation properties, can be low, which can be an effect implemented by drying according to the supercritical drying method of the present invention described above.

Specifically, the difference in thermal conductivity between the inner end 11 and the outer end 12 at room temperature (25° C.) in the state in which the silica aerogel blanket 10 is wound can be 1.0 mW/mK or less, preferably 0.7 mW/mK or less, 0.5 mW/mK or less, or 0.3 mW/mK or less.

In this case, the inner end 11 and the outer end 12 refer to both end sections in the case in which the blanket is divided into three parts on the basis of the longitudinal direction in the state in which the winding of the blanket is released. The inner end 11 means a segment on the side of an inner terminal 11a located inside the roll in the state in which the blanket is wound, and the outer end 12 means a segment on the side of an outer terminal 12a located outside the roll in the wound state.

The longitudinal direction refers to the orthogonal direction with either the inner terminal 11a or the outer terminal 12a for a 1 batch silica aerogel blanket roll (1 batch roll), and the length measured in the corresponding direction can be defined as the total length L of the silica aerogel blanket.

In this case, a "1 batch roll" can refer to one silica aerogel blanket obtained from one silica wet gel blanket placed inside a first or second supercritical extractor in the state of being wound for supercritical drying. This means that the size thereof can vary depending on the size of the supercritical extractor or the degree to which the blanket is wound, and thus, the total length L of one batch roll can vary. A typical technician can appropriately change the size of the one batch roll in consideration of the internal volume of the supercritical extractor, the use of the blanket, and the like. The effect of thermal conductivity of the inner end and the outer end according to the present invention is applicable to all one batch rolls of various sizes because it means the difference in thermal conductivity of a segment divided into three parts on the basis of the total length of the one batch roll, rather than the absolute size of the one batch roll.

Also, the silica aerogel blanket satisfies the difference in thermal conductivity between the inner end and the outer end, and the thermal conductivity of the inner end at room temperature (25° C.) can be 13-20 Mw/mK, preferably 15-19 Mw/mK, more preferably 15-18 Mw/mK.

Factors affecting the heat transfer in a porous material are mainly density and structure. That is, even when materials have the same microstructure, if the materials are high in density, the thermal conductivity thereof can be different from each other depending on the structure of pores. Also, factors in the microstructure which affect thermal conduction include grain form, an amount of phase, grain orientation, porosity, and the like.

In the supercritical drying process, if carbon dioxide is continuously supplied without repeating the supply and the discontinuation of the supply of carbon dioxide, due to the channeling phenomenon of carbon dioxide, the silica wet gel is not sufficiently dried to the pores thereof, thereby causing the deterioration in the physical properties of the silica aerogel blanket, and exhibits high thermal conductivity.

In addition, the silica aerogel blanket produced in the present invention can exhibit low water repellency, and the water repellency thereof can be 5% or less, preferably 4% or less, more preferably 2% or less.

The water repellency can be calculated by Equation 2 below.

Water repellency (%)={[Weight of silica aerogel blanket after being impregnated with water(wt %)−Weight of silica aerogel blanket before being impregnated with water(wt %)]/[Weight of silica aerogel blanket before impregnated with water(wt %)]}×100       <Equation 2>

The water repellency refers to the degree to which the silica aerogel blanket absorbs water, and low water repellency means high hydrophobicity, through which low thermal conductivity can be maintained.

Accordingly, the aerogel blanket of the present invention can be usefully used as a thermal insulation material, a thermal insulation material, or a non-combustible material for aircrafts, ships, automobiles, building structures, and the like, as well as for plant facilities for insulating and cooling, such as piping and industrial furnaces of various industrial facilities.

EXAMPLES

Hereinafter, the present invention will be described in detail with reference to Examples. However, the following Examples are merely illustrative of the present invention and are not intended to limit the scope of the present invention.

Example 1

75% hydrated tetraethylorthosilicate (HTEOS) (silica concentration 19-20 wt %), ethanol, and water were mixed in a weight ratio of 1:2.25:0.35 to prepare a silica sol. The silica sol was added with 0.44 wt % of a base catalyst solution based on the HTEOS, to a solution in which ethanol and ammonia water were mixed in a weight ratio of 210:1, and the silica sol added with the solution was impregnated in glass fiber to induce gelation. After the completion of the gelation, the silica sol subjected to gelation was aged by being left to stand using 80-90% of an ammonia solution (2-3 vol %) based on the silica sol at a temperature of 50-70° C. for 1 hour. Thereafter, the aged silica sol was aged again by being left to stand using 80-90% of a hexamethyldisilazane (HMDS) solution (2-10 vol %) based on the silica sol at a temperature of 50-70° C. for 4 hours to produce a silica wet gel blanket roll.

The silica wet gel blanket roll subjected to surface modification was introduced into a 70 L first supercritical extractor heated to 70° C., and then carbon dioxide of 75° C. was added thereto and maintained for 20 minutes until 160 bar was reached. Subsequently, another silica wet gel blanket roll was introduced into a 70 L second supercritical extractor heated to 70° C., and then carbon dioxide of 75° C. was added thereto and maintained for 20 minutes until 160 bar was reached. Thereafter, carbon dioxide was supplied to the first supercritical extractor at a rate of 5.5 L/min for 20 minutes, while not supplying carbon dioxide to the second supercritical extractor. After 20 minutes, the supply of carbon dioxide to the first supercritical extractor was discontinued and carbon dioxide started to be supplied to the second supercritical extractor at a rate of 5.5 L/min for 20 minutes.

The above 40-minute process was seen as one process, and the process was repeated four times in total. That is, for a total of 160 minutes (2 hours and 40 minutes), the supply and the discontinuation of the supply of carbon dioxide were repeated four times at 20 minute intervals in each supercritical extractor.

Thereafter, ethanol extracted through a lower portion of the extractor was recovered. Thereafter, carbon dioxide was vented from the lower portion of the extractor over the period of 1 hour, and ambient drying was additionally performed in an oven of 150° C. to produce a silica aerogel blanket.

Example 2

The same was performed in the same manner as in Example 1 except that the supply and the discontinuation of the supply of carbon dioxide were repeated 5 times at 15 minute intervals (150 minutes) and then additionally performed once at 5 minute intervals (10 minutes).

Example 3

The same was performed in the same manner as in Example 1 except that the supply and the discontinuation of the supply of carbon dioxide were repeated 8 times at 10 minute intervals (160 minutes).

Example 4

The same was performed as in Example 1 except that the supply and the discontinuation of the supply of carbon dioxide were repeated 16 times at 5 minute intervals (160 minutes).

Example 5

The same was performed in the same manner as in Example 1 except that the supply and the discontinuation of the supply of carbon dioxide were repeated 2 times at 30 minute intervals (120 minutes) and then performed once at 20 minute intervals (40 minutes).

Comparative Example 1

The same was performed in the same manner as in Example 1 except that carbon dioxide was continuously introduced for 160 minutes in both the first and second supercritical extractors.

Comparative Example 2

The same was performed in the same manner as in Example 1 except that carbon dioxide was continuously introduced for 3 hours in both the first and second supercritical extractors.

Comparative Example 3

The same was performed in the same manner as in Example 1 except that carbon dioxide was continuously introduced for 2 hours 40 minutes in both the first and second supercritical extractors, and the flow rate of carbon dioxide was changed to 6.5 L/min.

Comparative Example 4

The same was performed in the same manner as in Example 1 except that carbon dioxide was supplied to the supercritical extractor in a liquid state by omitting the step of raising temperature and raising the inner pressure of the supercritical extractor, and that one supercritical extractor was used.

Specifically, the silica wet gel blanket roll subjected to surface modification was introduced into the 70 L first supercritical extractor, and then carbon dioxide in a liquid state was injected into the extractor to reach 25° C. and 70 bar. Thereafter, the temperature inside the extractor was raised to 70° C. over the period of 1 hour, and when 150 bar was reached, carbon dioxide was continuously supplied for 160 minutes.

Experimental Example 1

The carbon dioxide usage and the physical properties of the silica aerogel blanket produced when the supercritical drying step was performed according to each of Examples and Comparative Examples were compared.

1) Carbon dioxide usage

The amount of carbon dioxide supplied to the first or second supercritical extractor in each of Examples and Comparative Examples is shown in Table 1 below. This represents the total amount of carbon dioxide supplied to the first or second supercritical extractor, and the amounts in the first and second supercritical extracts were the same, and thus, are shown as one numerical value in Table 1 below.

2) Measurement of thermal conductivity

The thermal conductivity at room temperature (25° C.) of the silica aerogel blanket roll produced in each of Examples and Comparative Examples was measured using HFM 436 of NETZSCH Co, Ltd.

Measurement of inner end thermal conductivity: In the state in which the winding was released, the measurement was conducted for a portion which is from the inner end to one-sixth of the total length of the silica aerogel blanket based on the longitudinal direction (FIG. 1).

Measurement of outer end thermal conductivity: In the state in which the winding was released, the measurement was conducted for a portion which is from the outer end to one-sixth of the total length of the silica aerogel blanket based on the longitudinal direction (FIG. 1).

3) Measurement of water repellency

The water repellency of the silica aerogel blanket was calculated according to the following equation.

Water repellency (%)={[Weight of silica aerogel blanket after being impregnated with water(wt %)−Weight of silica aerogel blanket before being impregnated with water(wt %)]/[Weight of silica aerogel blanket before impregnated with water(wt %)]}×100

The duration of impregnation in water was 15 minutes, and the sample specifications and test methods were in accordance with ASTMC 1511.

TABLE 1

|  | Carbon dioxide usage (kg/batch) | Thermal conductivity (mW/mK) | | | Water repellency (%) |
|---|---|---|---|---|---|
|  |  | Inner end | Outer end | Thermal conductivity difference |  |
| Example 1 | 396 | 17.0 | 16.9 | 0.1 | 1.0 |
| Example 2 | 396 | 17.1 | 16.8 | 0.3 | 1.0 |
| Example 3 | 396 | 17.3 | 17.1 | 0.2 | 1.1 |
| Example 4 | 396 | 17.3 | 17.0 | 0.3 | 1.0 |
| Example 5 | 396 | 17.8 | 17.9 | 0.1 | 2.0 |
| Comparative Example 1 | 792 | 20.5 | 18.0 | 2.5 | 5.6 |
| Comparative Example 2 | 891 | 20.4 | 18.4 | 2.0 | 5.0 |
| Comparative Example 3 | 936 | 20.2 | 18.9 | 1.3 | 5.2 |
| Comparative Example 4 | 936 | 20.3 | 18.0 | 2.3 | 4.9 |

As shown in Table 1 above, in the cases of Examples 1 to 5 in which the supply and the discontinuation of the supply of carbon dioxide in the first and second supercritical extractors were alternately performed, when compared with Comparative Examples 1 to 3 in which carbon dioxide was continuously supplied to both the first and second supercritical extractors, the total amount of carbon dioxide used was reduced by about half, and the thermal conductivity of the inner end of the silica aerogel blanket was low, as well as the water repellency. Also, in the case of Comparative Example 4 in which carbon dioxide was supplied in a liquid state by omitting the step of raising temperature and raising the inner pressure of the supercritical extractor, the thermal conductivity of the inner end and the water repellency were high, and thus, it was confirmed that the physical properties of the silica aerogel blanket were deteriorated. That is, when using a supercritical drying method in which carbon dioxide is supplied and injected into two supercritical extractors alternately, it was confirmed that not only carbon dioxide usage is reduced, thereby increasing the efficiency of the supercritical drying process, but also the thermal conductivity of the inner end is low, and thus, a silica aerogel blanket having excellent insulation performance and excellent physical properties with low water repellency can be produced.

Meanwhile, Example 1 is a case in which a supercritical drying step was performed for a total of 160 minutes by repeating the supply and the discontinuation of the supply of carbon dioxide four times while maintaining a constant interval of 20 minute, and Examples 2 to 5 are cases in which a supercritical drying step was performed for a total of 160 minutes, but the interval of each step was changed to 15 minutes, 10 minutes, and 5 minutes. As it can be seen in Table 1, even though the interval of each step in which the supply and the discontinuation of the supply of carbon dioxide were alternated was changed, it was still possible to produce a silica aerogel blanket having excellent physical properties with low thermal conductivity at the inner end and low water repellency.

That is, when the supercritical drying step is performed by alternately repeating the supply and the discontinuation of the supply of carbon dioxide in two supercritical extractors, even when the timing of alternating the supply and the discontinuation of the supply of carbon dioxide is variously changed, it was confirmed that the effects of reducing the carbon dioxide usage and improving the physical properties of the silica aerogel blanket, and the like were still exhibited.

Experimental Example 2

Using the silica aerogel blanket produced in Example 1 and Comparative Example 1, the ethanol recovery rate (%) in each supercritical drying process was calculated as follows.

Ethanol recovery rate (%)=[(Amount of ethanol discharged and recovered from supercritical extractor)/(Amount of ethanol in silica wet gel blanket introduced into supercritical extractor)]×100

The ethanol recovery rate (%) over time in the supercritical drying process of each of Example 1 and Comparative Example 1 was calculated and shown in FIG. 4, and the ethanol recovery at the elapsed time of 40 minutes, 80 minutes, 120 minutes, and 160 minutes since the start of extraction was respectively calculated and shown in Table 2 below.

TABLE 2

|  | Example 1 | | | | Comparative Example 1 | | | |
|---|---|---|---|---|---|---|---|---|
| Extraction duration (min) | 40 | 80 | 120 | 160 | 40 | 80 | 120 | 160 |
| Ethanol recovery amount (mL) | 2856 | 3468 | 3753.6 | 3876 | 2424 | 3232 | 3555.2 | 3757.2 |

Figure 4:
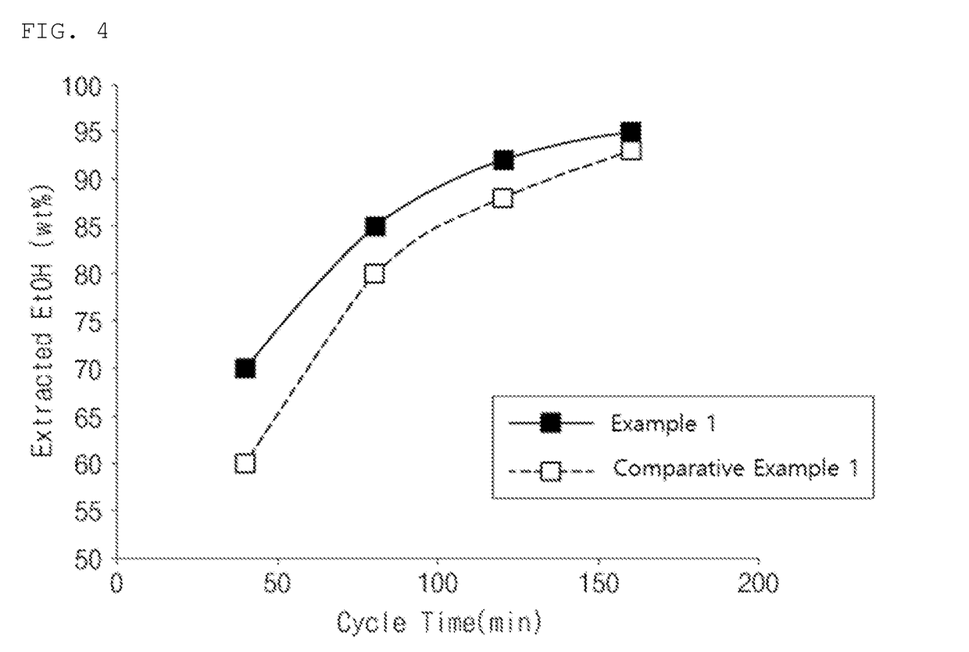
FIG. 4 shows the ethanol recovery rate (%) in Example 1 and in Comparative Example 1 of the present invention.

As shown in FIG. 4 and Table 2, in the case of Example 1, although only half of the amount of carbon dioxide was used compared to the amount of carbon dioxide used in Comparative Example 1, the ethanol recovery rate was higher than that of Comparative Example 1. That is, in Example 1, while only half of the amount of carbon dioxide was used, the amount of residual ethanol was reduced, and the efficiency of the supercritical drying process was further increased.

DESCRIPTION OF SYMBOLS

10: silica aerogel blanket

L: total length

11: inner end

12: outer end

11*a*: inner terminal

12*a*: outer terminal

P1: thermal conductivity measuring point at the inner end

P2: thermal conductivity measuring point at the outer end

The invention claimed is:

1. A supercritical drying method for simultaneously drying two silica wet gel blankets using a first and a second supercritical extractor to produce two silica aerogel blankets, the method comprising:
    placing a first silica wet gel blanket inside the first supercritical extractor and placing a second silica wet gel blanket into the second supercritical extractor, the extractors connected to a common carbon dioxide supply; (a) supplying carbon dioxide to the first supercritical extractor containing the first silica wet gel blanket and while not supplying carbon dioxide to the second supercritical extractor containing the second silica wet gel blanket; and (b) not supplying carbon dioxide to the first supercritical extractor containing the first silica wet gel blanket and while supplying carbon dioxide to the second supercritical extractor containing the second silica wet gel blanket, wherein
    the steps (a) and (b) are performed alternately at least two times each;
    venting the carbon dioxide from each extractor; and
    removing the silica aerogel blankets from the first and second supercritical extractors.

2. The method of claim 1, wherein the steps (a) and (b) are performed alternately at least four times each.

3. The method of claim 1, wherein before placing the first silica wet gel blanket inside the first supercritical extractor and placing the second silica wet gel blanket inside the second supercritical extractor, raising the temperature inside each of the first and second supercritical extractors is performed.

4. The method of claim 3, wherein in the step of raising the temperature, the temperature inside the first and second supercritical extractors is raised to 40-100° C.

5. The method of claim 1, wherein the steps (a) and (b) performed for the first time among the steps of (a) and (b) which are repeatedly performed, are performed by increasing the inner pressure of the first or second supercritical extractor to 75-250 bar while supplying carbon dioxide to the first or second supercritical extractor.

6. The method of claim 1, wherein the carbon dioxide supplied to the first and second supercritical extractors has a temperature of 50-100° C.

7. The method of claim 1, wherein the steps (a) and (b) are each independently performed for 5-30 minutes.

8. The method of claim 1, wherein the amount of carbon dioxide supplied to the first or second supercritical extractor is 300-700 kg/batch.

9. The method of claim 1, wherein the supercritical drying method has a solvent recovery rate of 90% or greater, solvent recovery rate being calculated by Equation 1 below:

Solvent recovery rate (%)=[(Amount of solvent discharged and recovered from supercritical extractor)/(Amount of solvent in silica wet gel blanket introduced into supercritical extractor)]×100. <Equation 1>

10. A method for producing a silica aerogel blanket, the method comprising:
    preparing a silica sol;
    impregnating the silica sol in a blanket base material and then subjecting the impregnated silica sol to gelation;
    subjecting a silica wet gel blanket formed by the gelation reaction to surface modification; and
    subjecting the silica wet gel blanket to supercritical drying, wherein
    the supercritical drying is performed by the method of claim 1.

11. A silica aerogel blanket having a difference in thermal conductivity between an inner end and an outer end at room temperature (25° C.) in the state in which the blanket is wound is 1.0 mW/mK or less,
    wherein the inner end and the outer end of the blanket refer to both end sections in the case in which the blanket is divided into three parts on the basis of the longitudinal direction in the state in which the winding of the blanket is released.

12. The silica aerogel blanket of claim 11, wherein the thermal conductivity of the inner end of the silica aerogel blanket at room temperature (25° C.) is 13-20 mW/mK.

13. The silica aerogel blanket of claim 11, wherein the water repellency of the silica aerogel blanket calculated by Equation 2 below is 5% or less:

Water repellency (%)={[Weight of silica aerogel blanket after being impregnated with water(wt %)−Weight of silica aerogel blanket before being impregnated with water (wt %)]/[Weight of silica aerogel blanket before impregnated with water(wt %)]}×100 <Equation 2>

* * * * *